Sept. 8, 1953 W. M. MALLOY 2,651,138
POISON BAIT HOLDER FOR EXTERMINATING RODENTS
Filed Nov. 25, 1949 3 Sheets-Sheet 1
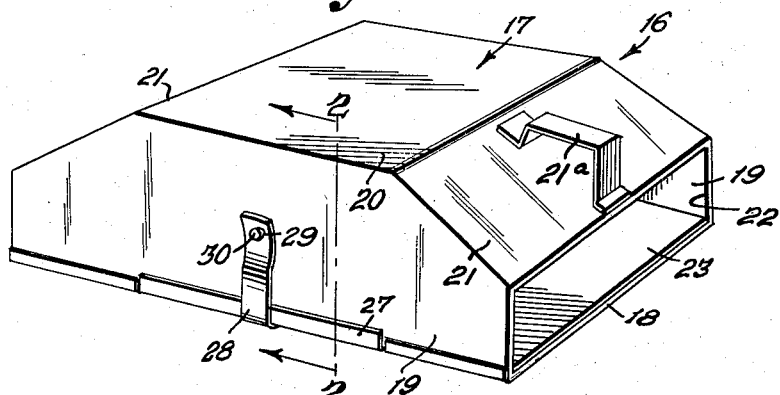
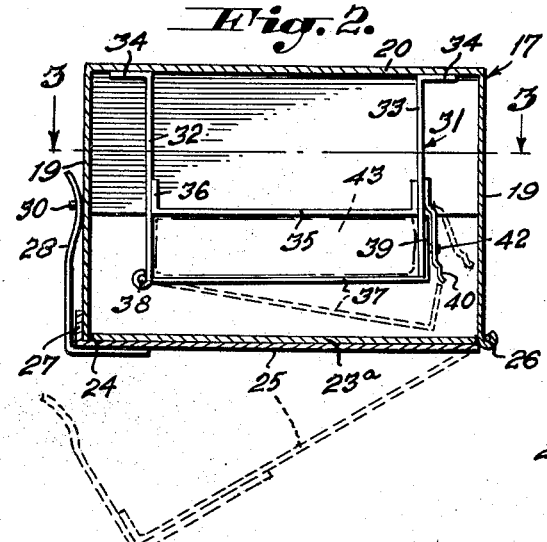
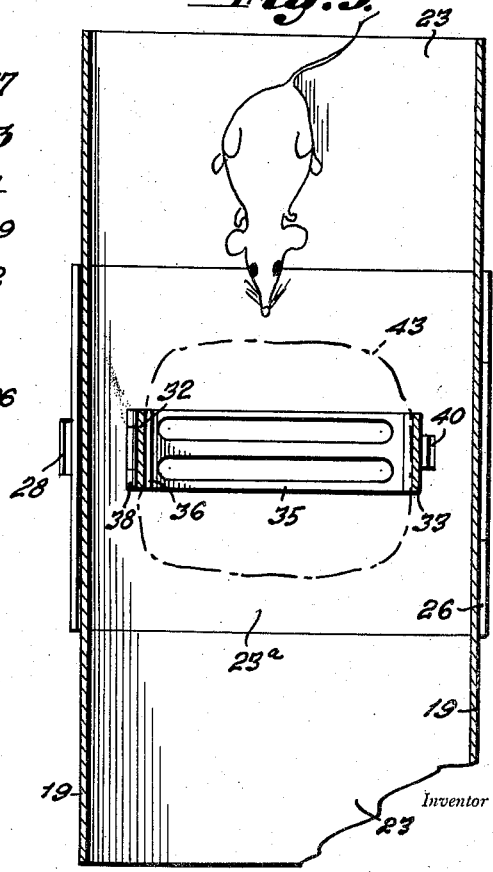
Inventor
William M. Malloy
By John N. Randolph
Attorney

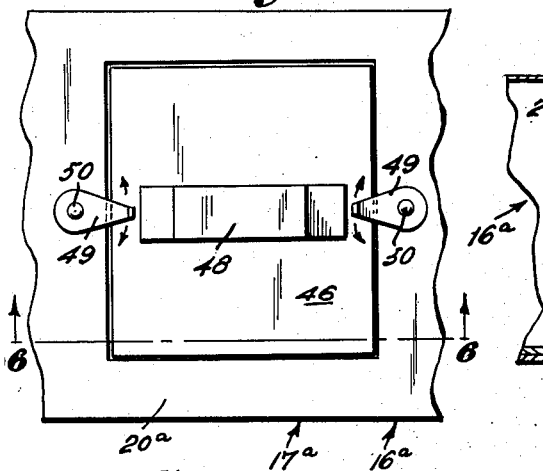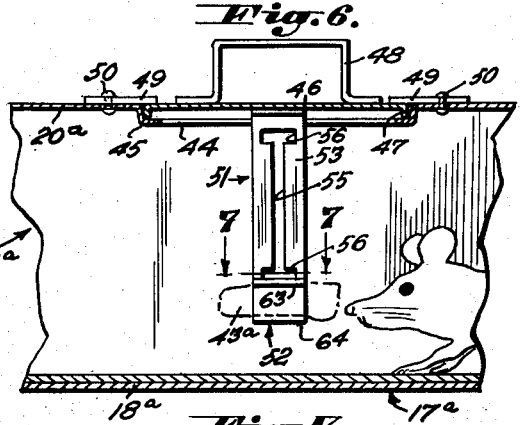

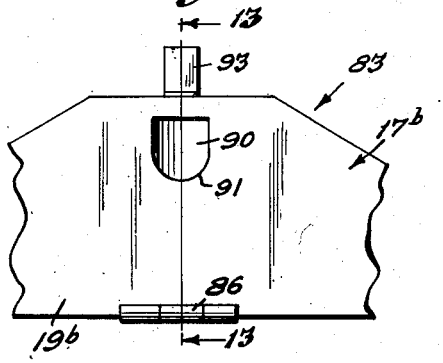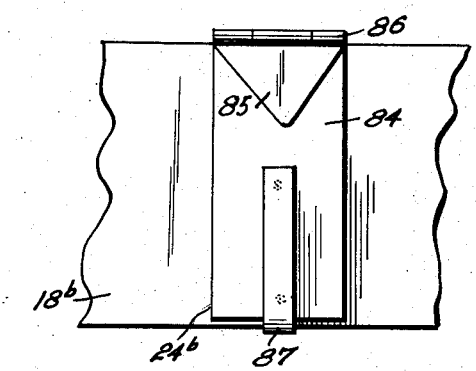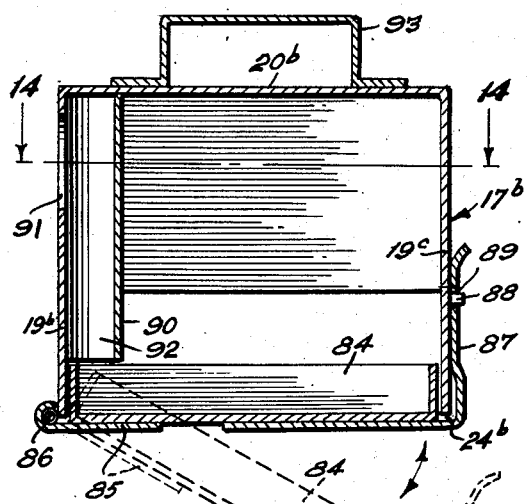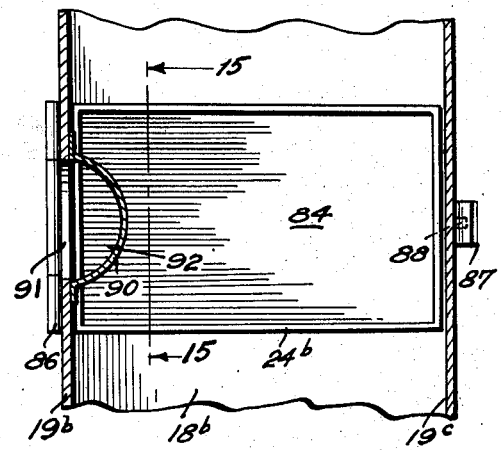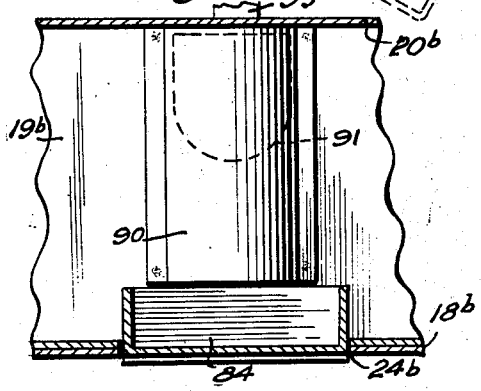
Inventor
William M. Malloy
By John N. Randolph
Attorney Patented Sept. 8, 1953

2,651,138

UNITED STATES PATENT OFFICE 2,651,138

POISON BAIT HOLDER FOR EXTERMINATING RODENTS

William M. Malloy, Stony Point, N. Y.

Application November 25, 1949, Serial No. 129,445

1 Claim. (Cl. 43—131)

This invention relates to a novel construction of poison bait holder and by means of which a poisonous bait may be contained within a receptacle or hover of such a shape as to afford ready accessibility to rodents such as rats and mice but which is of such a size and shape that domestic animals, pets and poultry are denied access thereto and are prevented from reaching the poisonous bait.

Still another object of the invention is to provide a bait holder by means of which the bait can be held or contained in such a manner as to prevent rodents from dragging the bait and mass from the holder and so that rodents will only be permitted to gnaw small pieces of the poisonous bait from the bait body.

Still a further object of the invention is to provide a receptacle wherein any crumbs will be retained therein and which may fall from the bait while it is being gnawed upon by a rodent, thereby preventing such crumbs from escaping from the receptacle and being possibly consumed by poultry, pets or domestic animals.

Still a further and important object of the invention is to provide a receptacle or holder which will afford ready accessibility to rodents and which is so constructed that the interior thereof will not be unduly darkened and wherein the bait is supported in a manner convenient to rodents and readily accessible and in a location which will not appear suspicious to a rodent.

Various other objects and advantages of the invention will hereinafter become more fully apparent from the following description of the drawings, illustrating presently preferred embodiments thereof, and wherein:

Figure 1 is a perspective view of one form of the invention;

Figure 2 is a cross sectional view thereof taken substantially along a plane as indicated by the line 2—2 of Figure 1;

Figure 3 is a horizontal sectional view taken substantially along a plane as indicated by the line 3—3 of Figure 2;

Figure 4 is an enlarged perspective view of the bait holding unit;

Figure 5 is a fragmentary top plan view of a slightly modified form of the invention;

Figure 6 is a fragmentary longitudinal sectional view thereof taken substantially along a plane as indicated by the line 6—6 of Figure 5;

Figure 7 is a horizontal sectional view taken substantially along a plane as indicated by the line 7—7 of Figure 6;

Figure 8 is an enlarged perspective view of another form of bait holding unit corresponding to the bait holding unit illustrated in Figures 6 and 7;

Figure 9 is a perspective view of a third form of bait holding unit and which may be employed interchangeably with the bait holding unit as illustrated in Figures 4 and 8, and Figure 10 is a cross sectional view similar to Figure 2 showing a receptacle with the bait holding unit of Figure 9 disposed therein and illustrated in section.

Referring more specifically to the drawings, and first with reference to the form of the invention as illustrated in Figures 1 to 4, the poisonous bait container or receptacle in its entirety is designated generally 16 and includes a receptacle or box 17 composed of a bottom 18, corresponding upwardly extending side walls 19 and a top wall including an intermediate portion 20 which is disposed substantially parallel to the bottom 18 and downwardly inclined end portions 21 which terminate above and in spaced relationship to the ends of the bottom 18 and which combine with the end portions of the side walls 19 to form a relatively restricted elongated opening 22 at the end of the receptacle 17. The shape of the receptacle 17 as illustrated in Figure 1 constitutes a preferred shape as it provides an opening 22 at each end of the receptacle which extends the width thereof and is therefore sufficiently large to admit ample light to the interior of the receptacle yet which is of a height to exclude domestic animals, poultry and pets from the receptacle while affording ready access therethrough to rodents such as rats and mice. However, the receptacle 17 could be made of any other desired shape having an entrance and exit opening or openings of proper size for accomplishing the same result. The receptacle 17 is preferably formed of sheet metal and as this will tend to deter rodents which are not accustomed to treading on a metal surface from entering the receptacle 17, the bottom 18 thereof may be covered with a covering 23 of any suitable material such as cardboard, wood or cloth, which may be suitably bonded to the upper side of the receptacle bottom. The receptacle bottom 18 is provided with a relatively large opening 24 intermediate of its ends and which extends from side-to-side thereof. The opening 24 is normally closed by a trap door 25 which extends transversely of the bottom 18 and which is hinged at 26 at one end thereof to the lower edge of one side wall 19 and which has an upstanding lip 27 to engage the other side wall when the door 25 is in a closed position, as illustrated in full lines in Figure 2. A spring latch member 28 has one end suitably secured to the outer side of the door 25 and is provided with a free end which projects upwardly from the lip 27 and which is resiliently disposed relatively to the door 25. Said spring latch 28 is provided with an opening adjacent its free end as seen at 29 to detachably engage a pin 30 which projects outwardly from the last mentioned side wall 19 and which is disposed to be received in the opening 29 when the trap door 25 is in a closed position. The resiliency of the latch 28 urges it into engagement with the pin 30 and said latch may be manually sprung outwardly to disengage it from said latch pin 30. The upper or inner surface of the door 25, which forms a part of the bottom 18, when in a closed position, is covered by a separate intermediate section 23a of the covering 23. The receptacle 17 may be provided with a carrying handle located on any desired part thereof as for example in the location of the handle 21a in Figure 1 and on the upper side of one of the top wall portions 21.

The poisonous bait container 16 also includes a bait holder, designated generally 31 and best illustrated in Figure 4. The bait holder 31 includes a pair of hanger members 32 and 33 each of which is provided with an out-turned flange 34 at one end thereof. The holder 31 also includes a bar 35 of open work construction which extends between the hangers 32 and 33 and which has upturned flanges 36 at the ends thereof which are suitably secured to said hangers. The flanges 34 are adapted to be suitably anchored to the underside of the top portion 20 and intermediate of the ends of the receptacle 17 and so that the bait holder 31 is disposed transversely of the receptacle, as illustrated in Figures 2 and 3. The bar 35 is spaced from the other, lower end of the hangers 32 and 33 and an open work bar 37 is hingedly connected at one end thereof by a hinge 38 to the lower end of the hanger 32 and is provided with an upturned opposite end 39 which is adapted to engage the outerside of the lower portion of the hanger 33 when the bar 37 is disposed substantially parallel to the bar 35. A spring latch member 40 is secured at one end thereof to the outer side of the hanger 33, above the bar portion 39 and has an outwardly offset free end provided with an opening 41 to receive a latch pin 42 carried by and which projects from the outerside of the bar portion 39. The spring latch 40 is spring urged into engagement with the pin 42 for releasably supporting the bar 37 in its full line position of Figure 4 and the lower, free end of the spring latch may be sprung outwardly to its dotted line position of Figure 2 to allow the bar 37 to swing downwardly as illustrated in dotted lines in Figures 2 and 4.

To bait the poisonous bait container 16, the latch 28 is released to allow the trap door 25 to swing downwardly, after which the latch 40 is released and the bar 37 swung away from the bar 35. This may be accomplished with the receptacle 17 in an inverted position. A solid bait mass 43, in the form of a block or biscuit, or which may be of any other desired form, is then positioned against the bar 35 after which the bar 37 is returned to its full line position of Figures 2 and 4 and latched in this position by the spring latch 40. The bait 43 is of sufficient thickness so as to be clamped between the open work bars 35 and 37.

From the foregoing it will be readily apparent that the bait receptacle 16 may be very readily baited and placed in a position infested by rats or mice. The open ends 22 will admit sufficient light to the interior of the receptacle 17 and afford sufficient room for a rat or mouse to readily enter said receptacle from either end thereof. The bait 43 is located at a level so that rodents may readily feed thereon and is preferably so constructed that pieces may be gnawed off of the bait mass yet will resist any efforts of the rodent to break off large hunks of the bait. Accordingly, it will be substantially impossible for a rodent to carry away more of the bait than it could readily consume thereby eliminating the danger of pieces of bait being strewed around in locations where it would be available to poultry, livestock or pets. The receptacle 17 is of sufficient length so that poultry, livestock and pets cannot obtain access to the bait 43 and any particles of the bait which are dropped as a rodent is gnawing on the bait will fall on to the bottom 18 or trap door 25 and at a sufficient distance from the open ends 22 so that said particles will not be accessible to livestock, poultry or pets.

Figures 5 to 8 illustrate a slightly different form of the bait container, designated generally 16a and which includes a receptacle 17a, only a portion of which has been illustrated but which conforms in shape to the receptacle 17 and differs therefrom in that the trap door in the bottom thereof is omitted and the bottom 18a is made continuous from end-to-end of the receptacle 17a. The receptacle 17a is also modified in that its intermediate top portion 20a is provided with a relatively large opening 44 defined by a downwardly offset flange 45, forming an integral part of the top portion 20a. A closure member 46 is adapted to normally close the opening 44 and is provided with a depending marginal flange 47 which seats upon the downwardly offset flange 45 for supporting the upper surface of the closure 46 in substantially the same plane as the top portion 20a. The closure 46 is provided with an upwardly projecting handle or bail 48 by which said closure may be removed from the receptacle 17a and by which the receptacle may be carried when the closure 46 is secured thereto, as will hereinafter be described.

A pair of swinging latch members 49 are each connected swingably to the upper surface of the top portion 20a by a rivet or other fastening 50, for swinging movement in a plane parallel to the top portion 20a and said latch members 49 are disposed so that the free ends thereof may be swung to positions to overlie portions of the closure 46, as illustrated in Figures 5 and 6, for securing the closure 46 in its position of Figures 5 and 6, or said latch members 49 may be swung in either direction out of engagement with the closure 46 to permit said closure to be removed from the receptacle 17a.

A bait holding unit, designated generally 51, is demountably supported in the receptacle 17a by the cover 46 and includes a substantially U-shaped frame, designated generally 52 having corresponding substantially parallel legs 53 which are provided with outturned flanges 54 at their upper ends which are suitably secured to the under side of the closure 46 so that the bait holding unit 51 will be disposed transversely of the receptacle 17a and intermediate of its ends. The legs 53 are provided with corresponding longitudinally extending slots or openings 55 which are provided with lateral enlargements 56 at each of their ends. A movable bait retaining bar, designated generally 57 includes an intermediate portion of open work construction, designated 58, of a length less than the distance between the legs 53. The movable bait retaining bar 57, beyond one end of its intermediate portion 58 is provided with a restricted portion 59 having a further restricted neck portion 60 beyond said portion 59. A neck portion 61 extends from the opposite end of the intermediate portion 58 and is connected to a restricted portion 62 which is disposed therebeyond. The portions 59 and 62 are of a width to engage in the lateral enlargements 56 and the neck portions 60 and 61 are of a width to slidably engage the slots 55. The terminal portions 63 of the movable bait bar 57 are of approximately the same width as the intermediate portion 58. The intermediate portion 64 of the U-shaped frame 52 is likewise of open work construction and is of approximately the same width as the bar portion 58.

From the foregoing it will be readily apparent that with the cover 46 removed from the receptacle 17a and with the movable bait holding bar 57 displaced upwardly relatively to the slots 55, that a bait 43a, similar to the bait 43 may be placed on the stationary bait holding bar 64. The movable bait holding bar 57 may be supported in its aforementioned elevated position by positioning the bar portions 59 and 62 in engagement with the upper slot enlargements 56. After the bait has been applied to the bar 64, the movable bait holding bar 57 may be grasped by either handle end 63 and displaced from left to right of Figure 8 to move the neck portions 60 and 61 into registry simultaneously with the slots 55 and so that said neck portions can slide downwardly through the slots 55. The movable bait holding bar 57 is then pressed downwardly on the bait to bring the bar portions 59 and 62 into alignment with the two lower slot enlargements 56 after which said movable bait holding bar 57 is displaced in the opposite direction or from right to left of Figure 8 to move the bar portions 59 and 62 into engagement with the lower slot enlargements 56 for locking the movable bait holding bar in its lowermost position, as illustrated in Figure 7, and so that the bait 43a will be clamped between the bars 58 and 64 and supported within the receptacle 17a, when the cover 46 is reapplied, in substantially the same position that the bait 43 is supported by the bait holding unit 31.

Figures 9 and 10 illustrate another form of bait holding unit designated generally 65 and which may be substituted for either the bait holding unit 31 or the bait holding unit 51.

The bait holding unit 65 includes an inverted substantially U-shaped frame 66 the intermediate portion 67 of which may be suitably secured either to the intermediate top surface 20 or to the cover 46 and so that the substantially parallel legs 68 and 68a of the frame 66 will extend downwardly therefrom. The legs 68 and 68a are connected adjacent but spaced from their lower free ends by a stationary bait holding bar 69 of open work construction, which extends therebetween and which is suitably secured at ends to the legs 68 and 68a. The leg 68 at its lower end is provided with spaced pairs of hinged barrels 70 each pair of which is adapted to receive therebetween a hinged barrel 71 which is connected thereto by a hinge pin 72. The two hinged barrels 71 are formed integral with laterally spaced complementary ends of two bars 73 which are integrally connected at their opposite ends by a transverse portion 74. Said bars 73 are turned upwardly at a point adjacent the cross bar 74 to provide an upstanding flange 75 which is adapted to engage the outer side of the leg 68a when the bars 73 are disposed beneath and substantially parallel to the stationary bait holding bar 69. A lever 76 is provided with a short end 77 which is disposed at substantially a right angle to the remainder of said lever and which terminates in a transverse sleeve portion 78 which is journaled on a pin 79. The pin 79 has its ends anchored in the bars 73, adjacent the cross bar 74 and in the flange portion 75. The bar 76 fits loosely into the space between the bars 73 to combine therewith to form an open work construction similar to the stationary bar 69 and the other, free end of said lever 76 terminates in a transversely disposed spring lip 80 which is adapted to yieldably engage frictionally against a portion of the inner side of the leg 68 for supporting said lever 76 in substantially the same plane as the bars 73. The lever portion 77 is provided with a rounded projection 81 on its inner side which seats in a recess 82 on the outer side of the leg 68a when the lever 76 is disposed in the same plane as the bars 73 to form a latch structure for latching the parts 73 and 76 in their full line positions of Figure 9 and in their positions of Figure 10. It will be readily apparent that a bait, similar to the bait 43 or 43a and not shown in Figures 9 and 10, may be readily clamped between the bar 69 and the portions of the bars 73 and lever 76 which are disposed therebeneath. In order to swing the parts 73 and 76 away from the bar 69 for removing the bait or for opening the bait holder 65 for applying a bait thereto, the lip 80 is grasped and pressed away from the leg 68 so that the lever 76 may be swung downwardly and outwardly on its pivot 79 and relatively to the bars 73, thereby disengaging the projection 81 from the recess 82 and so that the bars 73 may swing downwardly on the pivots 72 and in the opposite direction and carrying with them the lever 76.

Figure 10 shows the bait holding unit 65 disposed in a receptacle, designated generally 83, which may correspond, for example, with the receptacle 17. The intermediate portion of the U-shaped frame 67 is suitably secured to the underside of the intermediate portion 84 of the top wall of the receptacle 83 and transversely of said receptacle. A hinged bottom trap door 85, which is hingedly mounted at 86 and normally maintained in a closed position by a latch 87, corresponding to the latch 28, may be unlatched and swung downwardly to an open position in the same manner as the trap door 25, and the opening 88, corresponding to the opening 24, which is closed by the trap door 85 when in a closed position, is disposed beneath the bait holding unit 65 so that the parts 73 and 76 when swung downwardly to their dotted line positions of Figure 9 may extend outwardly through said opening 88.

Various modifications and changes are contemplated and may obviously be resorted to, without departing from the spirit or scope of the invention as hereinafter defined by the appended claim.

I claim as my invention:

The combination of a receptacle provided with an entrance opening, and a bait holder, said bait holder comprising a pair of hanger members secured to and projecting from a wall of said receptacle remote to the entrance opening thereof, and toward an opposite wall thereof, said hanger members being spaced from one another transversely of the receptacle, a slotted bar extending between and secured at its ends to the hanger members, said bar being spaced from the ends of the hanger members, a second slotted bar pivotally connected at one end to a free end of one of the hanger members, latch means detachably latching the other end of the second slotted bar to a free end of the other hanger member to position the bars in spaced substantially parallel positions for clamping a poisonous bait therebetween in an exposed position within the receptacle, said last mentioned wall having a relatively large opening through which the last mentioned end of said second slotted bar is swingably movable when unlatched and through which the bait is applied to the bait holder or removed therefrom, a closure hingedly connected at one end to the receptacle, and a latch detachably latching the other end of the closure to the receptacle for closing said last mentioned receptacle opening.

WILLIAM M. MALLOY.

References Cited in the file of this patent

UNITED STATES PATENTS

| Number | Name | Date |
|---|---|---|
| 442,222 | Gunderson | Dec. 9, 1890 |
| 512,543 | Forberg | Jan. 9, 1894 |
| 890,430 | Mann | June 9, 1908 |
| 978,742 | Hatchell | Dec. 13, 1910 |
| 1,108,724 | Draper et al. | Aug. 25, 1914 |
| 1,291,015 | Keller | Jan. 14, 1919 |
| 1,302,160 | Hedrich | Apr. 29, 1919 |